(12) United States Patent
Kuroiwa et al.

(10) Patent No.: US 11,888,939 B2
(45) Date of Patent: Jan. 30, 2024

(54) REMOTE MONITORING SYSTEM AND REMOTE MONITORING METHOD

(71) Applicant: Mitsubishi Electric Corporation, Tokyo (JP)

(72) Inventors: Takeru Kuroiwa, Tokyo (JP); Tomoo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 17/600,428

(22) PCT Filed: Jun. 3, 2019

(86) PCT No.: PCT/JP2019/022032
§ 371 (c)(1),
(2) Date: Sep. 30, 2021

(87) PCT Pub. No.: WO2020/245888
PCT Pub. Date: Dec. 10, 2020

(65) Prior Publication Data
US 2022/0174116 A1    Jun. 2, 2022

(51) Int. Cl.
*G06F 11/30*     (2006.01)
*H04L 67/12*     (2022.01)

(52) U.S. Cl.
CPC .......... *H04L 67/12* (2013.01); *G06F 11/3006* (2013.01); *G06F 11/3051* (2013.01)

(58) Field of Classification Search
CPC .. H04L 67/12; G06F 11/3006; G06F 11/3051; G06F 11/3013; G06F 11/3058;
(Continued)

(56) References Cited

U.S. PATENT DOCUMENTS 6,301,615 B1    10/2001  Kutcher
10,841,122 B1 *  11/2020  Jensen ................ H04L 12/2816
(Continued)

FOREIGN PATENT DOCUMENTS

JP    2000-215130 A    8/2000
JP    2000-250833 A    9/2000
(Continued)

OTHER PUBLICATIONS

International Search Report of the International Searching Authority dated Jul. 23, 2019 for the corresponding international application No. PCT/JP2019/022032 (and English translation).

*Primary Examiner* — Eyob Hagos
(74) *Attorney, Agent, or Firm* — POSZ LAW GROUP, PLC

(57) ABSTRACT

A remote monitoring system includes a plurality of data collection devices and a data aggregation device. Each data collection device acquires, from one or more installed apparatuses, a set of data including information representing at least either an operational situation or operational detail of one or more installed apparatuses. Each data collection device stores collection side definition information for extracting the apparatus data from the set of data including the apparatus data and makes a request to the data aggregation device to update the collection side definition information when a predetermined condition is satisfied. The data aggregation device stores aggregation side definition information for extracting the apparatus data from the set of data, and transmits, when the request is received from one or more of the data collection devices, information for updating based on the aggregation side definition information to the one or more of the data collection devices. The data collection devices that have received the information for updating
(Continued)

each update the collection side definition information by using the information for updating.

19 Claims, 10 Drawing Sheets

(58) Field of Classification Search
CPC . G06F 17/40; G05B 2223/06; G05B 23/0221; H04Q 2209/60; H04Q 9/00; F24F 11/63; F24F 11/56
See application file for complete search history.

(56) References Cited

U.S. PATENT DOCUMENTS

| | | | |
|---|---|---|---|
| 11,055,797 B1* | 7/2021 | Carone | G06Q 50/163 |
| 2015/0362207 A1* | 12/2015 | Abiprojo | F24F 11/67 |
| | | | 702/183 |
| 2018/0231269 A1* | 8/2018 | Hiei | G16H 40/63 |
| 2018/0365096 A1* | 12/2018 | Mamillapalli | G06F 11/0778 |
| 2020/0103132 A1* | 4/2020 | Ginsberg | F24F 11/64 |
| 2020/0177445 A1* | 6/2020 | Yamamoto | H04L 63/101 |
| 2020/0284460 A1* | 9/2020 | Hur | F24F 11/64 |
| 2021/0071889 A1* | 3/2021 | Picardi | F24F 11/63 |
| 2021/0080141 A1* | 3/2021 | Tsuboi | F24F 11/63 |
| 2021/0239345 A1* | 8/2021 | Arensmeier | F24F 11/64 |
| 2022/0243943 A1* | 8/2022 | Taghvaeeyan | G06F 11/3058 |

FOREIGN PATENT DOCUMENTS

| | | |
|---|---|---|
| JP | 2001-344227 A | 12/2001 |
| JP | 2008-108195 A | 5/2008 |
| JP | 2009-064098 A | 3/2009 |
| JP | 2009-134699 A | 6/2009 |
| WO | 2009/057682 A1 | 5/2009 |

* cited by examiner

| DATA ID | HEADER VALUE | STORAGE LOCATION | DATA LENGTH |
|---|---|---|---|
| Data-001 | 0101 | 3 | 2 BYTES |
| Data-003 | 0102 | 3 | 2 BYTES |
| : | : | : | : |

FIG. 6

| DATA ID | HEADER VALUE | STORAGE LOCATION | DATA LENGTH | DEVICE ID RULE |
|---|---|---|---|---|
| Data-001 | 0101 | 3 | 2 BYTES | DEVICE ID >= 1000 AND DEVICE ID < 2000 |
| Data-002 | 0101 | 5 | 1 BYTE | DEVICE ID >= 1000 AND DEVICE ID < 3000 |
| Data-003 | 0102 | 3 | 2 BYTES | DEVICE ID >= 2000 AND DEVICE ID < 3000 |
| : | : | : | : | : |

REMOTE MONITORING SYSTEM AND REMOTE MONITORING METHOD

CROSS REFERENCE TO RELATED APPLICATION

This application is a U.S. national stage application of PCT/JP2019/022032 filed on Jun. 3, 2019, the contents of which are incorporated herein by reference.

TECHNICAL FIELD

The present disclosure relates to a remote monitoring system and a remote monitoring method.

BACKGROUND ART

In recent years, in terms of operating efficiency and cost reductions, a remote monitoring system is desired that can perform an operation of analyzing a cause of an anomaly in an installed apparatus, an operation of checking the operation of the installed apparatus, or other operations even at a remote site away from a site where the installed apparatus is installed. As an example of this system, Patent Literature 1 discloses a data management system including a data collection device that collects, from an installed apparatus, apparatus data used in monitoring and a data management device that receives the apparatus data from the data collection device to store the apparatus dat.

CITATION LIST

Patent Literature

Patent Literature 1: International Publication No, 2009/057682

SUMMARY OF INVENTION

Technical Problem

In many existing remote monitoring systems, a data collection device installed at an installed apparatus side has information for extracting necessary apparatus data from data acquired from an installed apparatus. For this reason, for example, if the model or a function of an installed apparatus is added or changed, in many cases, information for extracting apparatus data has to be updated on a data collection device side. Meanwhile, in a server, to ensure that a plurality of installed apparatuses installed at various sites continue to be collectively monitored, information for extracting apparatus data held by each data collection device has to be efficiently updated.

The present disclosure has been made to overcome the above-described issue and an object thereof is to provide a remote monitoring system and a remote monitoring method that enable efficient updating of information for extracting apparatus data targeted for collection.

Solution to Problem

A remote monitoring system of one embodiment of the present disclosure includes a plurality of data collection devices each configured to collect apparatus data including information representing at least either an operational situation or operational detail of one or more installed apparatuses from the one or more installed apparatuses; and a data aggregation device configured to communicate with the plurality of data collection devices and configured to receive and aggregate the apparatus data that the plurality of data collection devices have each collected. Each data collection device includes a first communication unit configured to acquire a set of data including the apparatus data from the one or more installed apparatuses, a collection side storage unit configured to store collection side definition information defining one or more items for extracting the apparatus data from the set of data, an extraction unit configured to extract the apparatus data from the set of data by using the collection side definition information, and a collection side update unit configured to, when a predetermined condition is satisfied, make a request to the data aggregation device to update the collection side definition information. The data aggregation device includes an aggregation side storage unit configured to store aggregation side definition information defining the one or more items each of the plurality of data collection devices uses for extracting the apparatus data from the set of data acquired by the first communication unit, and a processing communication unit configured to, when the request is received from one or more of the data collection devices, transmit information for updating based on the aggregation side definition information to the one or more of the data collection devices. The collection side update unit of each of the one or more of the data collection devices updates the collection side definition information by using the information for updating received from the data aggregation device.

A remote monitoring method of another embodiment of the present disclosure is implemented by a remote monitoring system including a plurality of data collection devices each configured to collect apparatus data including information representing at least either an operational situation or operational detail of one or more installed apparatuses from the one or more installed apparatuses, and a data aggregation device configured to communicate with the plurality of data collection devices and configured to receive and aggregate the apparatus data that the plurality of data collection devices have each collected. Each data collection device includes a collection side storage unit configured to store collection side definition information defining one or more items for extracting the apparatus data from a set of data including the apparatus data acquired from the one or more installed apparatuses and performs a first communication step of acquiring the set of data from the one or more installed apparatuses, an extraction step of extracting the apparatus data from the set of data by using the collection side definition information, and a collection side update step of, when a predetermined condition is satisfied, making a request to the data aggregation device to update the collection side definition information. The data aggregation device includes an aggregation side storage unit configured to store aggregation side definition information defining the one or more items each of the plurality of data collection devices uses for extracting the apparatus data from the set of data acquired in the first communication step and performs a processing communication step of, when the request is received from one or more of the data collection devices, transmitting information for updating based on the aggregation side definition information to the one or more of the data collection devices. In the collection side update step, each of the one or more of the data collection devices updates the collection side definition information by using the information for updating received from the data aggregation device.

Advantageous Effects of Invention

In the remote monitoring system and the remote monitoring method of the embodiments of the present disclosure, when the predetermined condition is satisfied, each of the plurality of data collection devices in the remote monitoring system transmits a request to the data aggregation device to update the collection side definition information defining one or more items for extracting apparatus data from a set of data acquired from one or more installed apparatuses. The data aggregation device in the remote monitoring system transmits, to one or more data collection devices that are a source of the request to update the collection side definition information, information for updating based on the aggregation side definition information each of the plurality of data collection devices uses for extracting the apparatus data from the set of data. Each of the one or more data collection devices updates the collection side definition information by using the information for updating received from the data aggregation device. Thus, in the data aggregation device, the information for extracting apparatus data can be collectively managed, and, in each data collection device, updating of the information for extracting apparatus data can be automated. As a result, the information for extracting apparatus data targeted for collection can be efficiently updated.

BRIEF DESCRIPTION OF DRAWINGS

FIG. 6 illustrates an example of aggregation side definition information in Embodiment 2.

DESCRIPTION OF EMBODIMENTS

Embodiments will be described below with reference to the drawings. Furthermore, the relationship between sizes of components in the following drawings may differ from the relationship between the actual sizes of the components.

Embodiment 1

Figure 1:
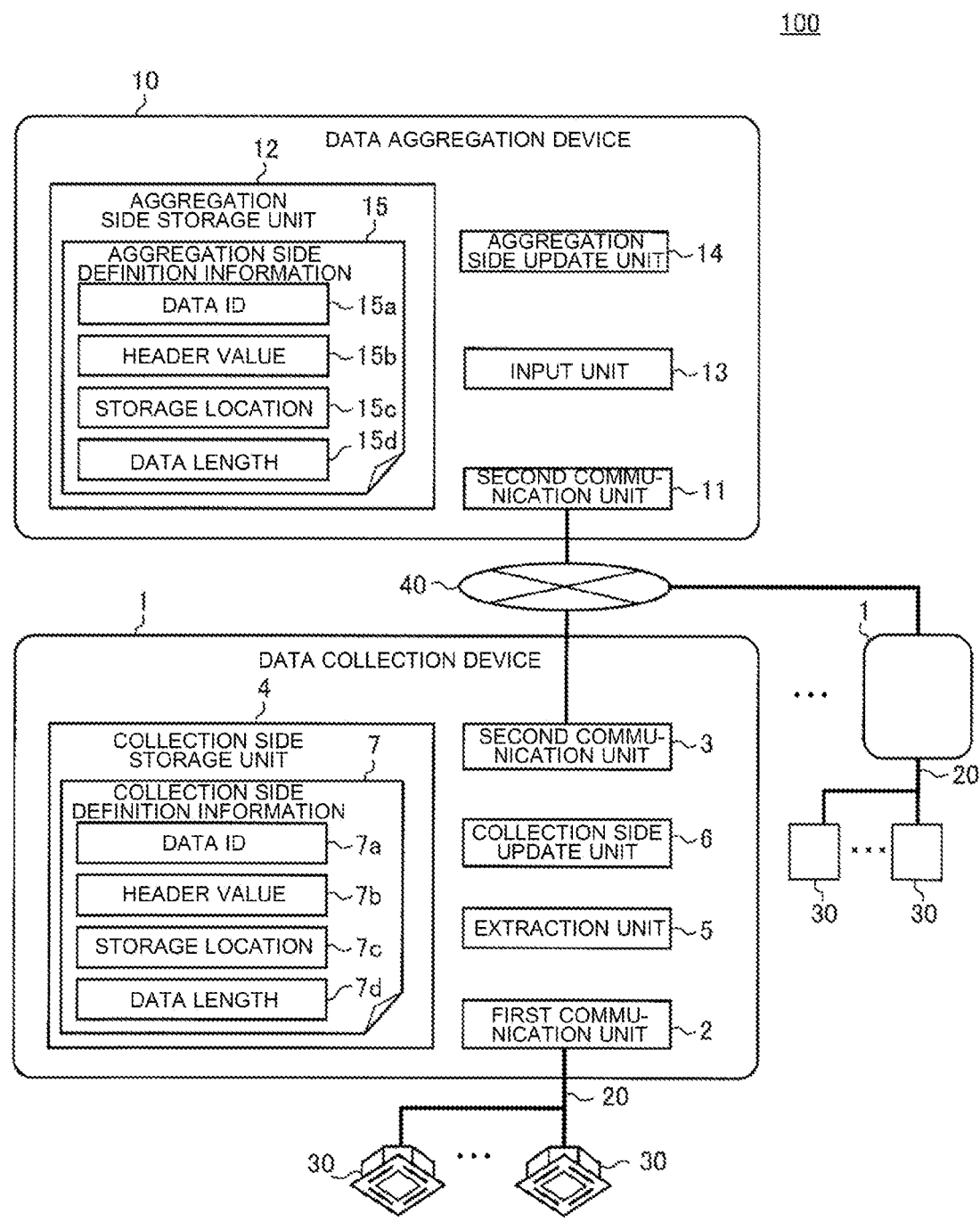
FIG. 1 is a block diagram illustrating a configuration of a remote monitoring system according to Embodiment 1.

FIG. 1 is a block diagram illustrating a configuration of a remote monitoring system according to Embodiment 1. A remote monitoring system 100 according to Embodiment 1 includes a plurality of data collection devices 1 and a data aggregation device 10. Each data collection device 1 is connected to one or more installed apparatuses 30 through a transmission line 20 in such a manner as to be able to communicate with each other and collects apparatus data from the one or more installed apparatuses 30. Incidentally, each installed apparatus 30 is, for example, an air-conditioning apparatus. Apparatus data is, for example, data representing an operational detail, such as an airflow velocity or set temperature of an air-conditioning apparatus, data representing an operational situation, such as an indoor temperature or outdoor temperature detected by the air-conditioning apparatus, or other pieces of data.

Each of the plurality of data collection devices 1 is connected to the data aggregation device 10 via a wide area network 40 and transmits apparatus data collected from an installed apparatus 30 to the data aggregation device 10. The data collection device 1 is, for example, an adaptor that performs appropriate processing on the apparatus data collected from the installed apparatus 30 to transmit the apparatus data to the data aggregation device 10. The data collection device 1 is provided at an installed apparatus 30 side, such as at the same site where the installed apparatus 30 is installed. The data aggregation device 10 is, for example, a server computer. The data aggregation device 10 analyzes the apparatus data to monitor the installed apparatus 30.

The data collection device 1 includes a first communication unit 2, a second communication unit 3, a collection side storage unit 4, an extraction unit 5, and a collection side update unit 6. The first communication unit 2 connects the data collection device 1 to an installed apparatus 30 through the transmission line 20. The data collection device 1 collects apparatus data from the installed apparatus 30 via the first communication unit 2. The data collection device 1 collects apparatus data by performing interception of a set of data, such as a packet or frame including apparatus data, transmitted and received between a plurality of installed apparatuses 30. Alternatively, the data collection device 1 collects apparatus data by making a request to the installed apparatus 30 to transmit apparatus data and receiving a set of data for a response to this request from the installed apparatus 30. Alternatively, the data collection device 1 may collect apparatus data, for example, by periodically receiving a set of data from the installed apparatus 30. Incidentally, a set of data includes one or more pieces of apparatus data. Hereinafter, the set of data refers to a packet.

The second communication unit 3 connects the data collection device 1 to the data aggregation device 10 via the wide area network 40. The collection side storage unit 4 stores a program for collecting apparatus data from an installed apparatus 30, a program for acquiring information for updating to be described from the data aggregation device 10, and collection side definition information 7, for example. The collection side definition information 7 is information that defines items for extracting apparatus data targeted for collection by the data collection device 1 from a packet. Specifically, the collection side definition information 7 is information that defines items, such as identification (ID) 7a identifying the type of apparatus data, a value 7b of a header (header value) of a packet including this apparatus data, a storage location 7c of this apparatus data in this packet, and a length 7d of this apparatus data (data length). Incidentally, the type of apparatus data is, for example, an indoor temperature or outdoor temperature that has been detected, or a set temperature or airflow velocity that has been set, but the type of apparatus data may be further subdivided information. For example, set temperatures acquired from a respective plurality of installed apparatuses 30 may be regarded as types different from one another, or set temperatures dealt with by a respective plurality of data collection devices 1 may be regarded as types different from one another. The ID 7a is uniquely defined for each type of apparatus data. Hereinafter, ID identifying the type of apparatus data may be referred to as data ID. Incidentally, the data ID 7a is an example of a first identifier identifying the type of apparatus data. Note that items are not limited to the above-described items.

Figures 2, 3:
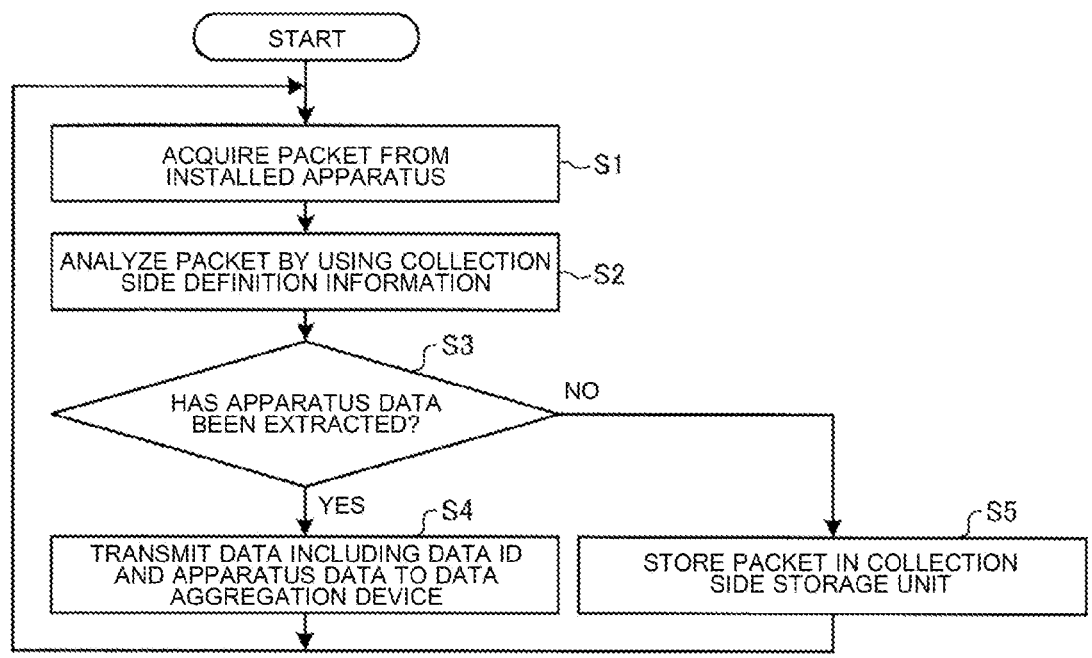
FIG. 2 illustrates an example of collection side definition information in Embodiment 1.
FIG. 3 illustrates an example of a preceding process that is performed by a data collection device according to Embodiment 1 before updating of the collection side definition information.

FIG. 2 illustrates an example of collection side definition information in Embodiment 1. In the collection side definition information 7 illustrated in FIG. 2, apparatus data whose data ID 7a is represented as "Data-001" is defined as apparatus data included in a storage location 7c "3" in a packet whose header value 7b is "0101" and having a data length 7d of two bytes. Similarly, in this collection side definition information 7, apparatus data whose data ID 7a is represented as "Data-003" is defined as apparatus data included in a storage location 7c "3" in a packet whose header value 7b is "0102" and having a data length 7d of two bytes.

Referring back to FIG. 1, when the extraction unit 5 acquires a packet from an installed apparatus 30, the extraction unit 5 extracts apparatus data from this packet by using the collection side definition information 7. Such an extraction process will be described. The extraction unit 5 searches in the collection side definition information 7 for a header value 7b matching a header value of the packet. When there is a header value 7b equal to the header value of the packet in the collection side definition information 7, the extraction unit 5 extracts apparatus data by using a storage location 7c and a data length 7d that are associated with this header value 7b in the collection side definition information 7. Specifically, in the case where there is a header value 7b equal to the header value of the packet in the collection side definition information 7, when data with a data length 7d is included in a storage location 7c of data in this packet, the extraction unit 5 extracts this data as apparatus data of data ID 7a, A specific description is given with reference to FIG. 2. In the case where a header value of a packet acquired by the first communication unit 2 is "0101", when data whose data length is two bytes is included in a storage location "3" in this packet, the extraction unit 5 extracts this data as apparatus data whose data ID 7a is "Data-001".

The extraction unit 5 analyzes the apparatus data extracted from the packet to identify, for example, an operational situation or operational detail on the installed apparatus 30 side. The second communication unit 3 transmits, to the data aggregation device 10, data including the apparatus data extracted by the extraction unit 5 and the data ID 7a of this apparatus data. Incidentally, such a transmission may be made every time apparatus data is extracted or may be made after a predetermined time interval. Alternatively, the transmission may be made after a predetermined number of pieces of apparatus data are extracted.

When the header value of the packet does not match a header value 7b in the collection side definition information 7, or when data with a data length 7d is not included in a storage location 7c in the packet, the extraction unit 5 does not extract apparatus data and stores this packet in the collection side storage unit 4. A case will be described below where the extraction unit 5 is not able to extract apparatus data from a packet. If, for example, a model or function is changed or added on the installed apparatus 30 side, a further item has to be defined in the collection side definition information 7 on the basis of such a change or addition. When such a definition of an item in the collection side definition information 7 is not made as necessary, the extraction unit 5 is not able to extract new apparatus data based on a change on the installed apparatus 30 side.

The extraction unit 5 extracts apparatus data in response to a change on the installed apparatus 30 side, and thus, when a predetermined condition is satisfied, the collection side update unit 6 makes a request to the data aggregation device 10 to update the collection side definition information 7 via the second communication unit 3. The data aggregation device 10 according to Embodiment 1 transmits, as a response to such a request, information for updating used for updating the collection side definition information 7 to the data collection device 1. The collection side update unit 6 of the data collection device 1 receives the information for updating from the data aggregation device 10 via the second communication unit 3 and updates the collection side definition information 7 by using this information for updating. The data aggregation device 10 will be described below.

The data aggregation device 10 includes a processing communication unit 11, an aggregation side storage unit 12, an input unit 13, and an aggregation side update unit 14. The processing communication unit 11 connects the data aggregation device 10 to a plurality of data collection devices 1 via the wide area network 40. The aggregation side storage unit 12 stores aggregation side definition information 15.

The aggregation side definition information 15 defines items for apparatus data of all installed apparatuses 30 targeted for monitoring by the remote monitoring system 100. The aggregation side definition information 15 includes information into which pieces of collection side definition information 7 described above that one or more respective data collection devices 1 have are merged. The aggregation side definition information 15 may include an item that can be defined on the basis of a future change or addition, for example, of a model or function on the installed apparatus 30 side. The aggregation side definition information 15 includes items, such as data ID 15a identifying the type of apparatus data, a header value 15b of a packet including this apparatus data, a storage location 15c of this apparatus data in this packet, and a data length 15d of this apparatus data. Incidentally, the data ID 15a is uniquely defined for each type of apparatus data, and data ID 15a and data ID 7a of respective pieces of apparatus data of the same type are equal to each other. The data aggregation device 10 classifies apparatus data by using data ID 7a transmitted together with the apparatus data from a data collection device 1 and performs monitoring by using this apparatus data. In the aggregation side definition information 15, a header value 15b, a storage location 15c, and a data length 15d that are associated with the data ID 15a equal to the data ID 7a are respectively equal to a header value 7b, a storage location 7c, and a data length 7d that are associated with this data ID 7a in the collection side definition information 7.

The aggregation side definition information 15 has a structure similar to that of the collection side definition information 7 illustrated in FIG. 2. When the information illustrated in FIG. 2 is read as an example of the aggregation side definition information 15, in the aggregation side definition information 15, apparatus data whose data ID 15a is "Data-001" is defined as apparatus data included in a storage location 15c "3" in a packet whose header value 15b is "0101" and having a data length 15d of two bytes.

When the processing communication unit 11 receives, from a data collection device 1, a request to update the collection side definition information 7, the processing communication unit 11 transmits information for updating based on the aggregation side definition information 15 to this data collection device 1. Incidentally, the processing communication unit 11 in Embodiment 1 transmits the aggregation side definition information 15 in response to the above-described request from the data collection device 1. The aggregation side definition information 15 is an example of information for updating. The input unit 13 accepts an input from an operator.

The aggregation side update unit 14 updates the aggregation side definition information 15. The aggregation side update unit 14 replaces the aggregation side definition information 15 stored in the aggregation side storage unit 12 with new aggregation side definition information 15 acquired by the processing communication unit 11 via the wide area network 40. Incidentally, the aggregation side update unit 14 acquires new aggregation side definition information 15, for example, from the cloud via the processing communication unit 11 and wide area network 40. The aggregation side update unit 14 may replace the aggregation side definition information 15 stored in the aggregation side storage unit 12 with new aggregation side definition information 15 input from the operator via the input unit 13. Furthermore, the aggregation side update unit 14 may acquire a difference between new aggregation side definition information 15 and previous aggregation side definition information 15, for example, via the wide area network 40 or the input unit 13 and may update the aggregation side definition information 15 by using this difference.

A configuration will be described below that allows the data collection devices 1 and the data aggregation device 10 to implement the above-described respective functions. Each data collection device 1 can be formed, for example, by a processor, such as a Central Processing Unit (CPU) or Micro Processing Unit (MPU), memory, such as Read Only Memory (ROM) or Random Access Memory (RAM), a storage device, such as a Hard Disk Drive (HOD), and a communication interface circuit. Functions of the first communication unit 2 and the second communication unit 3 can be implemented by the communication interface circuit. A function of the collection side storage unit 4 can be implemented by the memory or storage device. Functions of the extraction unit 5 and the collection side update unit 6 can be implemented by the processor reading and executing various programs stored in the memory or storage device. Functions of the extraction unit 5 and the collection side update unit 6 may be implemented by an integrated circuit, such as an Application Specific Integrated Circuit (ASIC) or Field-Programmable Gate Array (FPGA). All or a part of the data collection device 1 may be implemented by dedicated hardware.

The data aggregation device 10 can be formed, for example, by a processor, such as a CPU or MPU, memory, such as ROM or RAM, a communication interface circuit, a storage device, such as an HDD or portable storage medium, and an input device, such as a keyboard or touch panel. A function of the aggregation side storage unit 12 can be implemented by the memory or storage device, A function of the input unit 13 can be implemented by the input device. A function of the aggregation side update unit 14 can be implemented by the processor reading and executing various programs stored in the memory or storage device. A function of the processing communication unit 11 can be implemented by causing, for example, the processor and the communication interface circuit to operate in cooperation with each other. All or a part of the data aggregation device 10 may be implemented by dedicated hardware.

An update process of updating the collection side definition information 7 on a data collection device 1 side will be described in detail below. First, a preceding process will be described that is performed on the data collection device 1 side before such an update process. FIG. 3 illustrates an example of a preceding process that is performed by a data collection device according to Embodiment 1 before updating of the collection side definition information. Incidentally, in Embodiment 1, this preceding process, the update process of updating the collection side definition information 7, and an update process of updating the aggregation side definition information 15A performed by the aggregation side update unit 14 are performed asynchronously to one another.

In step S1 the first communication unit 2 of the data collection device 1 acquires a packet transmitted by an installed apparatus 30 connected to the transmission line 20. In step 32, the extraction unit 5 of the data collection device 1 analyzes the packet by using the collection side definition information 7. In such an analysis, in the case where a header value of this packet matches a header value 7b in the collection side definition information 7, when data with a data length 7d is stored in a storage location 7c in this packet, the extraction unit 5 extracts this data as apparatus data of data ID 7a. Incidentally, in the collection side definition information 7, the data ID 7a, the header value 7b, the storage location 7c, and the data length 7d are associated with one another as described above.

When the extraction unit 5 is able to extract apparatus data from the packet (step S3: YES), the second communication unit 3 transmits data including the extracted apparatus data and the data ID 7a of this apparatus data to the data aggregation device 10 in step S4. When the extraction unit 5 is not able to extract apparatus data from the packet (step S3: NO), the extraction unit 5 stores this packet in the collection side storage unit 4 in step S5.

Figure 4:
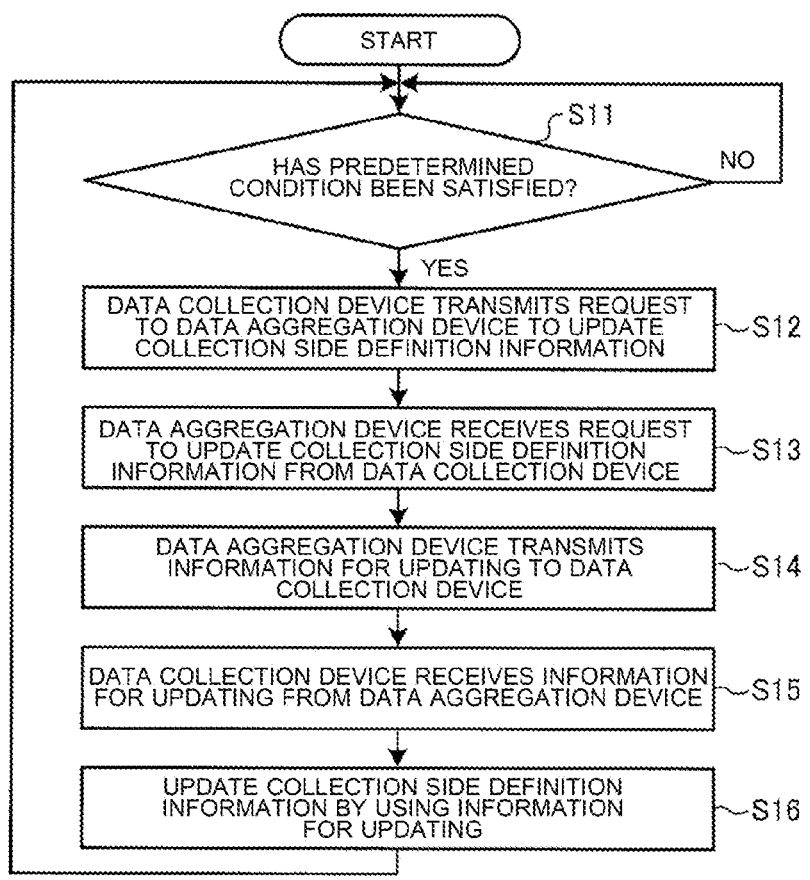
FIG. 4 illustrates an example of an update process of updating the collection side definition information performed by the remote monitoring system according to Embodiment 1.

FIG. 4 illustrates an example of the update process of updating the collection side definition information performed by the remote monitoring system according to Embodiment 1. In step S11 the collection side update unit 6 of the data collection device 1 determines whether or not a predetermined condition has been satisfied. This condition is, for example, that the number of packets stored in the collection side storage unit 4 in step S5 reaches a predetermined number. Alternatively, if the data collection device 1 includes a clock unit that is not illustrated, this condition is, for example, that the number of packets stored in the collection side storage unit 4 in step 35 reaches a predetermined number and the clock unit indicates that a predetermined first time period has elapsed since the latest updating of the collection side definition information 7. Note that this condition is not limited to these.

When the predetermined condition has not been satisfied (step S11: NO), the process performed by the data collection device 1 stays at step S11. When the predetermined condition has been satisfied (step S11: YES), the collection side update unit 6 transmits a request to the data aggregation device 10 via the second communication unit 3 to update the collection side definition information 7 in step S12. In step 313, the processing communication unit 11 of the data aggregation device 10 receives the request for the collection side definition information 7 from the data collection device 1. In step S14, the processing communication unit 11 of the data aggregation device 10 transmits information for updating to the data collection device 1 in response to the request received in step 313, Incidentally, the information for updating in Embodiment 1 is the aggregation side definition information 15.

In step S15, the second communication unit 3 of the data collection device 1 receives the information for updating from the data aggregation device 10. In step S16, the collection side update unit 6 updates the collection side definition information 7 stored in the collection side storage unit 4 by using the information for updating received from the data aggregation device 10. Incidentally, this update process may be a process of replacing the collection side definition information 7 with the received aggregation side definition information 15. The update process of updating the collection side definition information 7 may be performed immediately after receipt of the aggregation side definition information 15. If the data collection device 1 includes the clock unit, which is not illustrated, the update process may be performed after a point in time when the clock unit indicates that a predetermined second time period has elapsed since the second communication unit 3 received the aggregation side definition information 15 in step S14.

The remote monitoring system 100 according to Embodiment 1 includes a plurality of data collection devices 1 that each collect apparatus data including information representing at least either an operational situation or operational detail of one or more installed apparatuses 30, and the data aggregation device 10 that receives the apparatus data from each of the plurality of data collection devices 1 and aggregates the apparatus data. Each data collection device 1 includes the first communication unit 2, the collection side storage unit 4, the extraction unit 5, and the collection side update unit 6. The first communication unit 2 acquires a packet including the apparatus data from the one or more installed apparatuses 30. The collection side storage unit 4 stores collection side definition information 7 defining one or more items for extracting the apparatus data from the packet. The extraction unit 5 extracts the apparatus data from the packet by using the collection side definition information 7. When a predetermined condition is satisfied, the collection side update unit 6 makes a request to the data aggregation device 10 to update the collection side definition information 7. The data aggregation device 10 includes the aggregation side storage unit 12 and the processing communication unit 11. The aggregation side storage unit 12 stores aggregation side definition information 15 defining the one or more items each of the plurality of data collection devices 1 uses for extracting the apparatus data from the packet acquired from the one or more installed apparatuses 30. When the processing communication unit 11 receives, from one or more data collection devices 1, the request to update the collection side definition information 7, the processing communication unit 11 transmits the aggregation side definition information 15, which is an example of information for updating, to the one or more data collection devices 1. The collection side update unit 6 of each of the one or more data collection devices 1 updates the collection side definition information 7 by using the aggregation side definition information 15 received from the data aggregation device 10.

Thus, as long as only the aggregation side definition information 15 of the data aggregation device 10 is managed, when the predetermined condition is satisfied, the data collection device 1 can automatically acquire the aggregation side definition information 15 from the data aggregation device 10 and update the collection side definition information 7 held by itself. Hence, the collection side definition information 7 held by the data collection device 1 can be efficiently updated. Furthermore, information to be managed by the operator is only the aggregation side definition information 15 held by the data aggregation device 10, the data collection device 1 can continue to extract apparatus data, and the data aggregation device 10 can continue monitoring installed apparatuses 30 by receiving this data apparatus.

When the extraction unit 5 of the data collection device 1 in Embodiment 1 is not able to extract the apparatus data from the packet, the extraction unit 5 stores this packet in the collection side storage unit 4. When the number of packets stored in the collection side storage unit 4 in this way reaches a predetermined number, or when the number of packets stored in the collection side storage unit 4 reaches a predetermined number and a predetermined first time period has elapsed since updating of the collection side definition information 7, the collection side update unit 6 makes a request to the data aggregation device 10 to update the collection side definition information 7. This enables updating of the collection side definition information 7 based, for example, on a change or addition of the model or a function of an installed apparatus 30. Hence, the data collection device 1 can continuously collect necessary apparatus data. Furthermore, the collection side definition information 7 is caused to be updated, for example, at a point in time outside the operating hours of installed apparatuses 30 by setting the first time period, thereby making it possible to reduce the possibility of interfering, for example, with a process of analyzing a cause of an anomaly or a process of checking the installation and operation of an installed apparatus 30 that is performed by the data collection device 1 or the data aggregation device 10.

The data collection device 1 in Embodiment 1 further includes the second communication unit 3 that transmits the apparatus data extracted by the extraction unit 5 to the data aggregation device 10. The collection side update unit 6 makes the request to the data aggregation device 10 via the second communication unit 3. Thus, even when the data aggregation device 10 is installed apart from installed apparatuses 30, the data aggregation device 10 can acquire apparatus data and remotely monitor the installed apparatuses 30.

The data aggregation device 10 in Embodiment 1 further includes the input unit 13 that accepts an input from the operator, and the aggregation side update unit 14 that updates the aggregation side definition information 15 to latest aggregation side definition information 15 input to the input unit 13. Thus, the aggregation side definition information 15 of the data aggregation device 10 can be updated to a latest version based on a trend, for example, in the model or a function of an installed apparatus 30 targeted for monitoring, and installed apparatuses 30 are appropriately monitored in the remote monitoring system 100.

The data aggregation device 10 in Embodiment 1 further includes the aggregation side update unit 14 that updates the aggregation side definition information 15 to latest aggregation side definition information 15 received via the processing communication unit 11. Thus, the aggregation side definition information 15 of the data aggregation device 10 is automatically updated to a latest version based on a trend, for example, in the model or a function of an installed apparatus 30 targeted for monitoring. Hence; installed apparatuses 30 can be appropriately monitored in the remote monitoring system 100, and an operation performed by the operator can be simplified.

The one or more items in the collection side definition information 7 in Embodiment 1 include data ID 7a identifying the type of the apparatus data, a header value 7b of the packet including the apparatus data, a storage location 7c of the apparatus data in the packet, and a data length 7d of the apparatus data. Thus, when the items for extracting the apparatus data from the packet are defined in the collection side definition information 7, the data collection device 1 can extract the apparatus data from the packet quickly and accurately.

When the data collection device 1 receives the aggregation side definition information 15 from the data aggregation device 10, the collection side update unit 6 in Embodiment 1 updates the collection side definition information 7 immediately after receipt of the aggregation side definition information 15 or after a predetermined second time period has elapsed since receipt of the aggregation side definition information 15. Thus, a point in time when the collection side definition information 7 is updated can be changed according to the circumstances. For example, this point in time is set to a point in time outside the operating hours of installed apparatuses 30, thereby making it possible to reduce the possibility of interfering, for example, with a process of analyzing a cause of an anomaly or a process of checking the installation and operation of an installed apparatus 30 that is performed by the data collection device 1 or the data aggregation device 10.

The information for updating in Embodiment 1 is the aggregation side definition information 15. Thus, a process performed by the data aggregation device 10 for updating the collection side definition information 7 can be simplified, and the processing load on the data aggregation device 10 can be reduced.

The collection side update unit 6 in Embodiment 1 replaces the collection side definition information 7 stored in the collection side storage unit 4 with the aggregation side definition information 15 received from the data aggregation device 10. Thus, the update process of updating the collection side definition information 7 performed by the data collection device 1 can be simplified.

Embodiment 2

In the remote monitoring system 100 according to Embodiment 1 described above, the type of apparatus data collected by each data collection device 1 is not necessarily able to be set as a type specific to the data collection device 1. In other words, in the case where outdoor humidity is dealt with as apparatus data in one data collection device 1, there can be a case where outdoor humidity is not dealt with as apparatus data in another data collection device 1. In this case, in updating the collection side definition information 7 of this other data collection device 1, this other data collection device 1 may receive, from the data aggregation device 10, the aggregation side definition information 15 including an unnecessary item for extracting outdoor humidity. This raises the possibility that the amount of processing that is unnecessary for an operation of extracting apparatus data performed by the data collection device 1 may increase and the possibility that the capacity of the collection side storage unit 4 may be reduced.

Furthermore, there can be a case where the same data ID 7a in the collection side definition information 7 held by each of a plurality of data collection devices 1 is assigned to different apparatus data. For example, there can be a case where apparatus data to which data ID 7a "1" is assigned in one data collection device 1 is an indoor temperature and where apparatus data to which the data ID 7a "1" is assigned in another data collection device 1 is a set temperature. For example, in the case where, in a plurality of pieces of collection side definition information 7 of a plurality of data collection devices 1, the same combination, for example, of a header value 7b and a storage location 7c is for extracting different pieces of apparatus data, extraction units 5 of the respective plurality of data collection devices 1 may assign the same data ID 7a to the pieces of apparatus data different from each other extracted by using the pieces of collection side definition information 7 updated by using information for updating, such as the aggregation side definition information 15. Furthermore, in the future, for example, one piece of data ID 7a, or a combination of a header value 7b, a storage location 7c, and a data length 7d may be assigned to pieces of apparatus data different from each other in each of the plurality of data collection devices 1.

Meanwhile, there can be a case where, for example, the type or data ID 7a of apparatus data targeted for collection by each data collection device 1, or a storage location 7c of the apparatus data in a packet has to be changed in accordance with, for example, the model of an installed apparatus 30, a site where the installed apparatus 30 is installed, or a request from a user of the installed apparatus 30. A remote monitoring system 100A according to Embodiment 2 further includes a configuration to solve the above-described issues.

Figure 5:
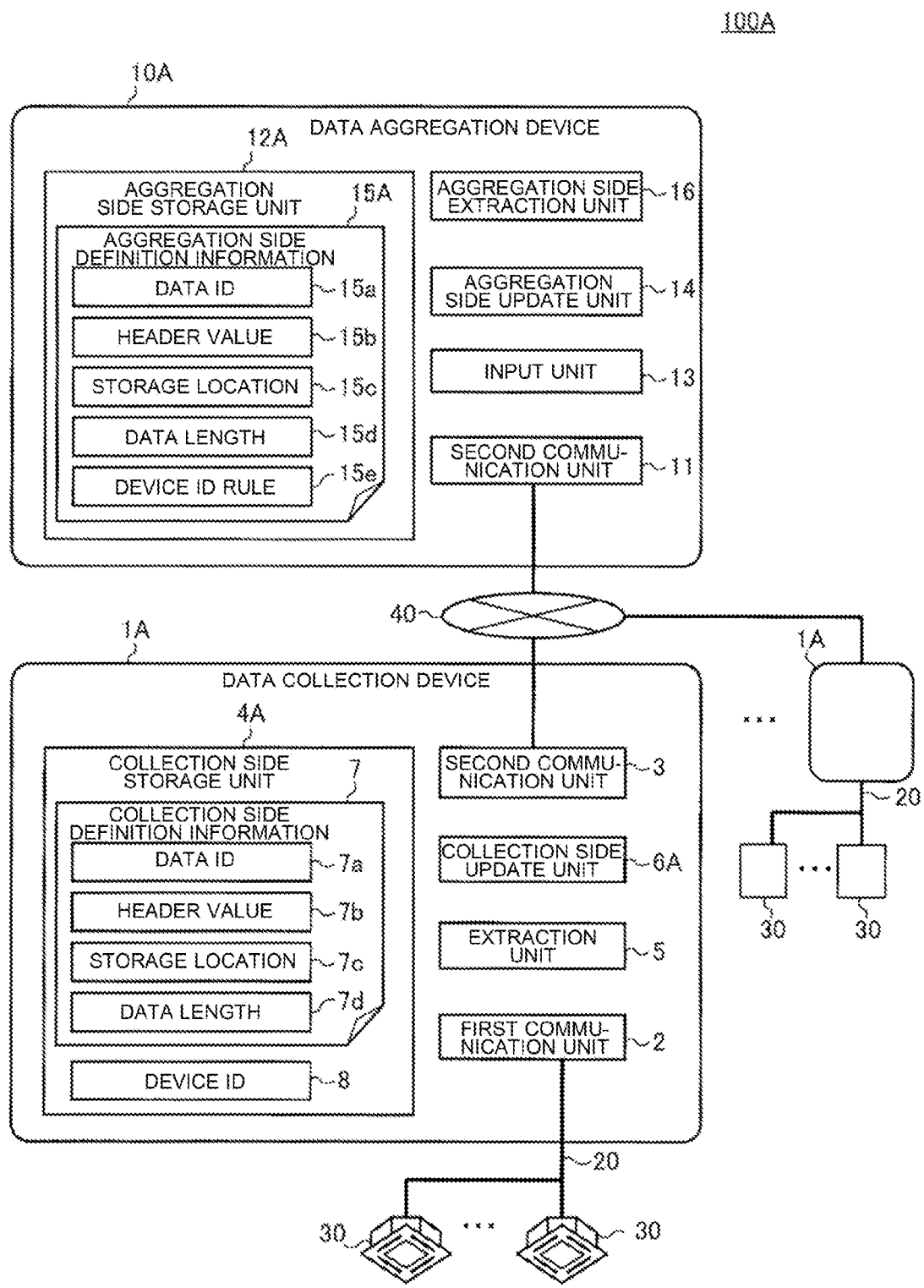
FIG. 5 is a block diagram illustrating a configuration of a remote monitoring system according to Embodiment 2.

FIG. 5 is a block diagram illustrating a configuration of a remote monitoring system according to Embodiment 2. A data aggregation device 10A in the remote monitoring system 100A according to Embodiment 2 controls, depending on each data aggregation device 10A, for example, a collection process and an extraction process of respectively collecting and extracting apparatus data performed by each of data collection devices 1A in Embodiment 2. The remote monitoring system 100A according to Embodiment 2, the data aggregation device 10A, and the data collection devices 1A will be described below. Incidentally, components that are similar to components in Embodiment 1 and perform similar operations are denoted by reference signs similar to those in Embodiment 1 described above and a description thereof is omitted unless otherwise specified.

Unique ID is assigned to each of a plurality of data collection devices 1A included in the remote monitoring system 100A according to Embodiment 2. Incidentally, ID of each data collection device 1 may be hereinafter referred to as device ID 8. The device ID 8 is an example of a second identifier for identifying the data collection device 1.

Each data collection device 1A in Embodiment 2 includes a collection side storage unit 4A in place of the collection side storage unit 4 in Embodiment 1 described above and includes a collection side update unit 6A in place of the collection side update unit 6 in Embodiment 1 described above. The collection side storage unit 4A stores device ID 8 in addition to the collection side definition information 7 described above. When a predetermined condition is satisfied, the collection side update unit 6A transmits, to the data aggregation device 10A via the second communication unit 3, the device ID 8, and data including a packet from which apparatus data has not been able to be extracted. Incidentally, as in Embodiment 1 described above, the predetermined condition may be that the number of packets that are stored in the collection side storage unit 4A and from which apparatus data has not been able to be extracted reaches a predetermined number. Alternatively, the condition may be that the number of these packet stored in the collection side storage unit 4A reaches a predetermined number and the dock unit indicates that a predetermined first time period has elapsed since the latest updating of the collection side definition information 7.

The data aggregation device 10A includes an aggregation side extraction unit 16 in addition to the configuration in Embodiment 1 described above. Furthermore, the data aggregation device 10A includes an aggregation side storage unit 12A in place of the aggregation side storage unit 12 in Embodiment 1. The aggregation side storage unit 12A stores aggregation side definition information 15A. The aggregation side definition information 15A includes a device ID rule 15e in addition to the data ID 15a, the header value 15b, the storage location 15c, and the data length 15d that are described above. The device ID rule 15e represents main data collection devices 1A that extract apparatus data stored in a storage location 15c in a packet with a header value 15b and having a data length 15d and data ID 15a, FIG. 6 illustrates an example of aggregation side definition information in Embodiment 2. In the aggregation side definition information 15A according to this example, the device ID rule 15e represents that data collection devices 1A whose device ID 8 is not less than 1000 and less than 2000 are main data collection devices that extract apparatus data included in a storage location 15c "3" in a packet with a header value 15b "0101" and having a data length 15d of two bytes and data ID 15a "Data-001", Similarly, in the aggregation side definition information 15A, the device ID rule 15e represents that data collection devices 1A whose device ID 8 is not less than 1000 and less than 3000 are main data collection devices that extract apparatus data included in a storage location 15c "5" in a packet with a header value 15b "0101" and having a data length 15d of one byte and data ID 15a "Data-002".

The aggregation side extraction unit 16 refers to the aggregation side definition information 15A and extracts, by using device ID 8 received from a data collection device 1A, apparatus data from a packet received together with this device ID 8. Furthermore, the aggregation side extraction unit 16 extracts data ID 15a of this apparatus data extracted from the packet, a header value 15b of the packet including this apparatus data, a storage location 15c of this apparatus data in the packet, and a data length 15d of this apparatus data from the aggregation side definition information 15A by using the device ID 8. The aggregation side extraction unit 16 transmits, to the data collection device 1A, which is a packet source, via the processing communication unit 11, information for updating including the data ID 15a, the header value 15b, the storage location 15c, and the data length 15d that have been extracted.

Figure 7:
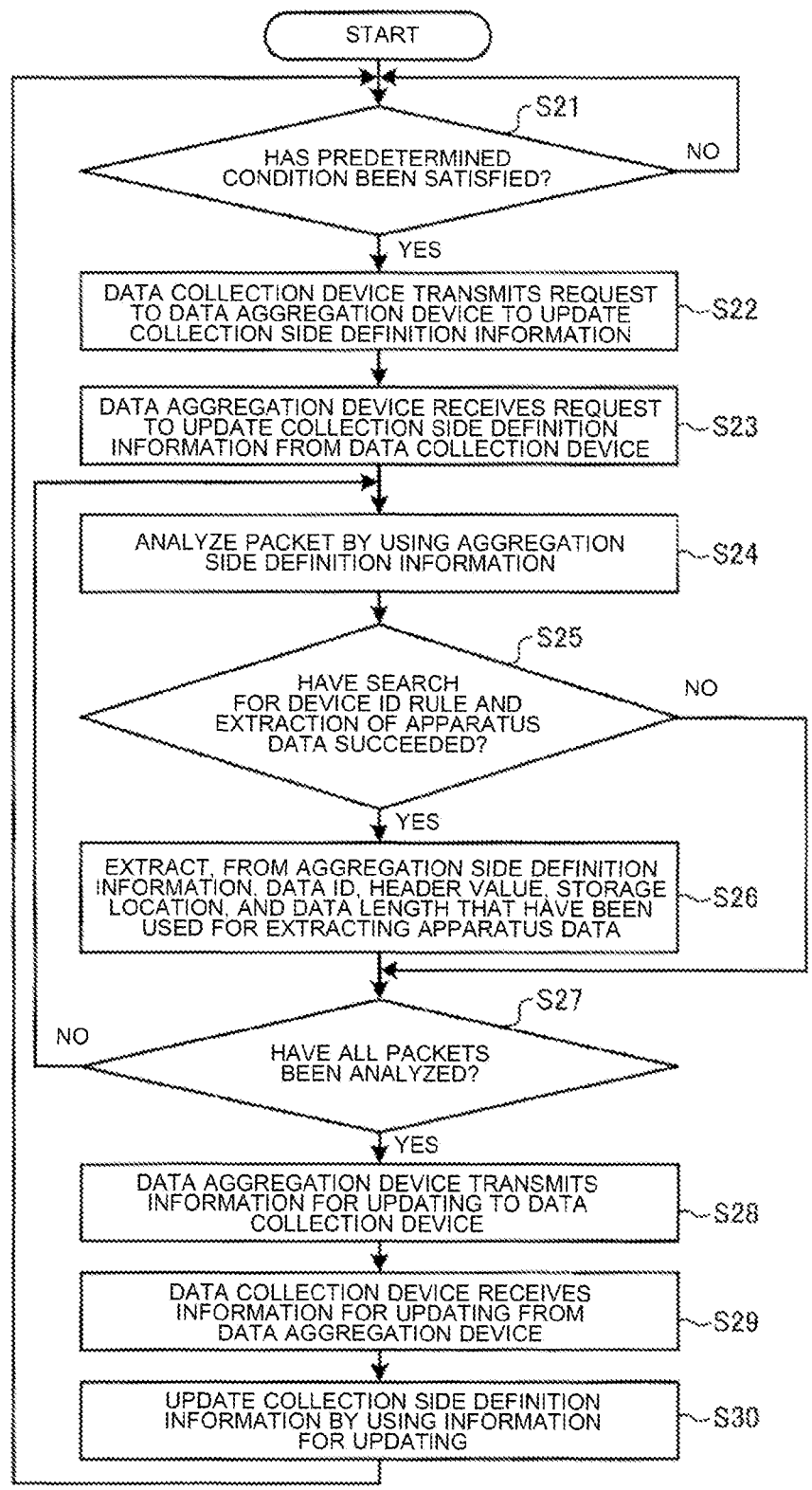
FIG. 7 illustrates an example of an update process of updating collection side definition information performed by the remote monitoring system according to Embodiment 2.

FIG. 7 illustrates an example of an update process of updating collection side definition information performed by the remote monitoring system according to Embodiment 2. In the remote monitoring system 100A according to Embodiment 2 as well, the preceding process illustrated in FIG. 3 is performed, Incidentally, this preceding process corresponds to the preceding process in which the collection side storage unit 4 described above with reference to FIG. 3 is read as the collection side storage unit 4A. Furthermore, in Embodiment 2 as well, an update process of updating the aggregation side definition information 15A is performed by the aggregation side update unit 14 as in Embodiment 1 described above. In Embodiment 2 as well, the preceding process, the update process of updating the collection side definition information 7, and the update process of updating the aggregation side definition information 15A are performed asynchronously to one another.

In step S21, the collection side update unit 6A of the data collection device 1 determines whether or not a predetermined condition has been satisfied. This condition is similar to that in Embodiment 1 described above. When this condition has not been satisfied (step S21: NO), the process performed by the data collection device 1A stays at step S21. When this condition has been satisfied (step S21: YES), the collection side update unit 6A transmits, via the second communication unit 3, a request to update the collection side definition information 7 in step S22. In this request, device ID 8, and packets stored in the collection side storage unit 4A by the extraction unit 5 in step S5 illustrated in FIG. 3 are included. In step S23, the processing communication unit 11 of the data aggregation device 10A receives the request to update the collection side definition information 7 from the data collection device 1A.

In step S24, the aggregation side extraction unit 16 of the data aggregation device 10A analyzes a packet included in the request received in step S23 by using the aggregation side definition information 15A, In such an analysis, the aggregation side extraction unit 16 first searches in the aggregation side definition information 15A for a device ID rule 15e in which the device ID 8 received by the processing communication unit 11 in step S23, or a group or the range of pieces of device ID 8 including this device ID 8 is stored. When there is a device ID rule 15e in which this device ID 8, or a group or the range of pieces of device ID 8 including this device ID 8 is stored, the aggregation side extraction unit 16 performs an extraction process of extracting apparatus data from the packet by using a combination of data ID 15a, a header value 15b, a storage location 15c, and a data length 15d that corresponds to this device ID rule 15e, Specifically, in the case where a header value of the packet matches the header value 15b, when data with the data length 15d is stored in the storage location 15c in this packet, the aggregation side extraction unit 16 extracts this data as apparatus data of the data ID 15a, Incidentally, in the aggregation side definition information 15A, the data ID 15a, the header value 15b, the storage location 15c, the data length 15d, and the device ID rule 15e are associated with one another.

In such an analysis process of step S24, at least either when such a process of searching for the device ID rule 15e fails or when the apparatus data is not able to be extracted (step S25: NO), the process performed by the data aggregation device 10A proceeds to step S27.

In step S24, when the aggregation side extraction unit 16 succeeds in searching for the device ID rule 15e and extracts the apparatus data (step S25: YES), the aggregation side extraction unit 16 extracts, in step S26, from the aggregation side definition information 15A, the data ID 15a, the header value 15b, the storage location 15c, and the data length 15d that have been used for extracting this apparatus data.

In step S27, the aggregation side extraction unit 16 determines whether or not the aggregation side extraction unit 16 has analyzed all packets received in step 323. When the analysis process has not been performed on all the packets by the aggregation side extraction unit 16 (step S27: NO), the aggregation side extraction unit 16 performs the process of step 324 and subsequent processes described above on packets that have not been analyzed.

When the analysis process has been performed on all the packets by the aggregation side extraction unit 16 (step S27: YES), the processing communication unit 11 transmits, in step 328, to the data collection device 1A, information for updating including the data ID 15a, the header value 15b, the storage location 15c, and the data length 15d that have been extracted by the aggregation side extraction unit 16 in step S26. In step S29, the second communication unit 3 of the data collection device 1A receives the data transmitted by the data aggregation device 10A in step S28.

In step 330, the collection side update unit 6 updates the collection side definition information 7 by using the information for updating received in step S29. Such updating is to add, for example, the data ID 15a, the header value 15b, the storage location 15c, and the data length 15d that are included in the information for updating received in step 329 to the collection side definition information 7.

A plurality of data collection devices 1A in Embodiment 2 have unique pieces of device ID 8 for identifying the respective plurality of data collection devices 1A. Furthermore, the aggregation side definition information 15A in Embodiment 2 defines one or more items associated with one or more pieces of device ID 8. In Embodiment 2, a request to update the collection side definition information 7 made by a data collection device 1A includes a packet from which the extraction unit 5 has not been able to extract apparatus data, and device ID 8 identifying the data collection device 1A. The data aggregation device 10A further includes the aggregation side extraction unit 16. The aggregation side extraction unit 16 searches in the aggregation side definition information 15A for one or more pieces of device ID 8 including the device ID 8 included in the request received from the data collection device 1A. When the one or more pieces of device ID 8 are included in the aggregation side definition information 15A, the aggregation side extraction unit 16 performs an extraction process of extracting apparatus data from the packet included in the request by using one or more items associated with the one or more pieces of device ID 8 and defined. When the apparatus data is extracted by the extraction process, the aggregation side extraction unit 16 extracts the one or more items associated with the one or more pieces of device ID 8 and defined. The processing communication unit 11 transmits information for updating including the one or more items extracted by the aggregation side extraction unit 16 to the data collection device 1A, which is a source of the request. Thus, each data collection device 1A can hold special collection side definition information 7. Hence, each data collection device 1A can have pieces of collection side definition information 7 based, for example, on an installation site of, details of a contract for, the model of, and a function of an installed apparatus 30, thereby increasing convenience.

Embodiment 3

Each data collection device 1A in Embodiment 2 described above has unique device ID 8. The aggregation side definition information 15A of the data aggregation device 10A includes a header value 7b, a storage location 7c, and a data length 7d that are associated with device ID 8 of each of a plurality of data collection devices 1A or a group including this device ID 8. For these reasons, when the data aggregation device 10A receives a request for information for updating from a data collection device 1A, the data aggregation device 10A can extract apparatus data by using details of items associated with device ID 8 included in this request or a group of pieces of device ID 8 including this device ID 8 in the aggregation side definition information 15A. Hence, even when pieces of collection side definition information 7 of the respective plurality of data collection devices 1A differ from one another, the data aggregation device 10A can appropriately extract apparatus data. Furthermore, the data aggregation device 10A in Embodiment 2 described above transmits, to the data collection device 1A, which is a source of the request, information for updating including information of each item used for extracting this apparatus data. Thus, the data collection device 1A can appropriately extract the apparatus data.

However, when a model change is made on a data collection device 1A or a setting change is made in a data collection device 1A, even if device ID 8 is not changed before and after such a change, there may be a difference in the collection side definition information 7 included in the data collection device 1A between before and after the change. At this time, when the data aggregation device 10A does not have information corresponding to new collection side definition information 7, the data aggregation device 10A is not able to extract apparatus data accurately and may fail to transmit appropriate information for updating to the data collection device 1A.

Furthermore, in the remote monitoring system 100A in Embodiment 2, when a new data collection device 1A having new device ID 8 is added, the data aggregation device 10A has to acquire, via the wide area network 40 or the input unit 13, information of items associated with this new device ID 8 or aggregation side definition information 15A including this information and update the aggregation side definition information 15A stored in the aggregation side storage unit 12A by using the acquired information. However, if the information acquired by the aggregation side update unit 14 has already been included in the previous aggregation side definition information 15A, such a process of acquiring this information and such an update process of updating the aggregation side definition information 15A are unnecessary processing.

Figure 8:
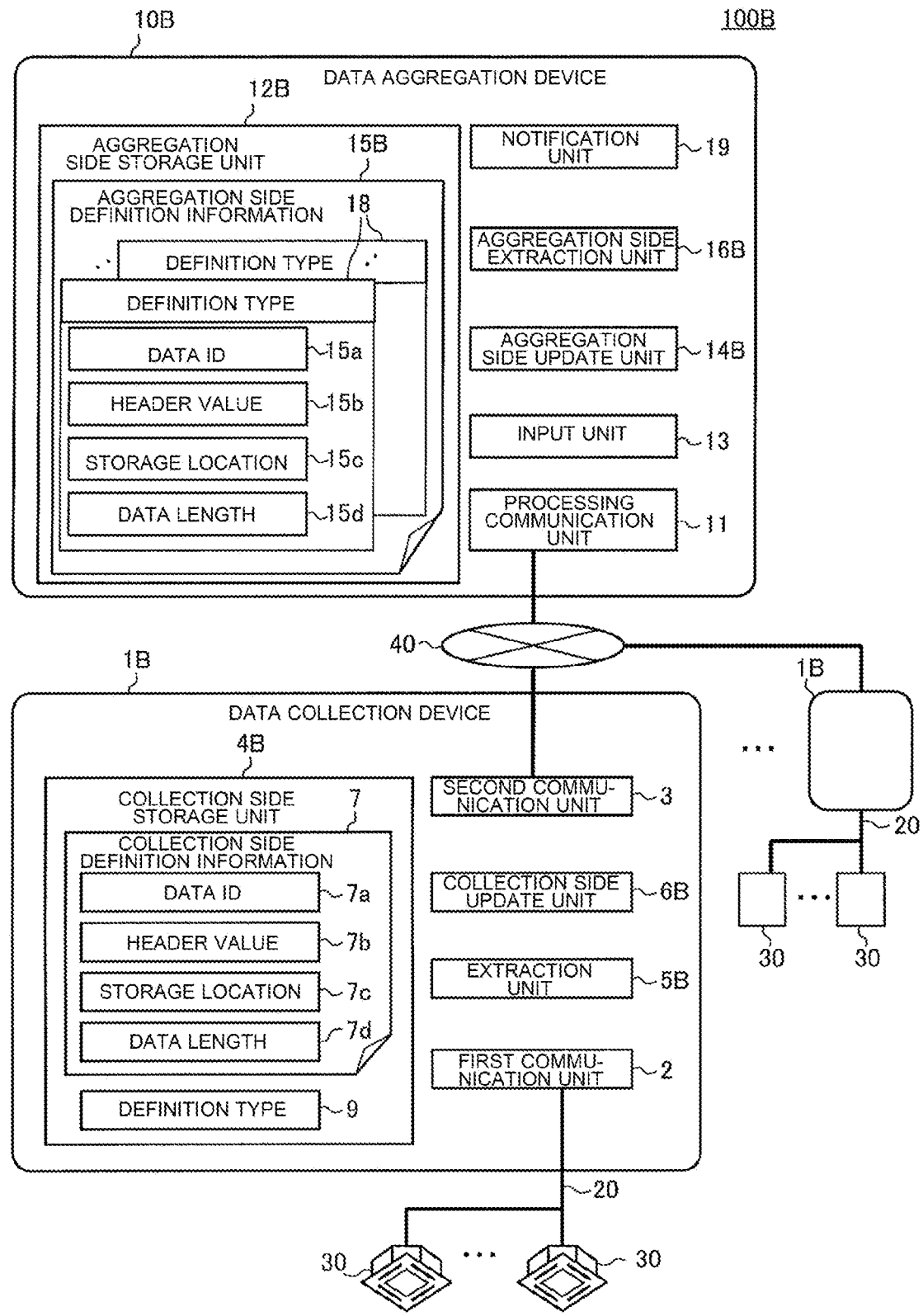
FIG. 8 is a block diagram illustrating a configuration of a remote monitoring system according to Embodiment 3.

FIG. 8 is a block diagram illustrating a configuration of a remote monitoring system according to Embodiment 3. Incidentally, hereinafter, components that are similar to components in Embodiment 1 or Embodiment 2 and perform similar operations are denoted by reference signs similar to those in Embodiment 1 or Embodiment 2 described above and a description thereof is omitted unless otherwise specified. In a remote monitoring system 100B according to Embodiment 3, a data aggregation device 10B grasps what the collection side definition information 7 of each of data collection devices 1B is about and transmits appropriate information for updating to the data collection device 1B even if a certain change is made on a data collection device 1B side. Furthermore, the data aggregation device 10B or the data collection device 1B in Embodiment 3 extracts apparatus data accurately even if a certain change is made on the data collection device 1B side. Furthermore, the data aggregation device 10B in Embodiment 3 omits unnecessary updating of the aggregation side definition information 15A and a process involved in such an update process.

Each data collection device 1B in Embodiment 3 includes a collection side storage unit 4B, an extraction unit 5B, and a collection side update unit 6B in place of, respectively, the collection side storage unit 4A, the extraction unit 5, and the collection side update unit 6A in Embodiment 2 described above. Furthermore, the data aggregation device 10B in Embodiment 3 includes an aggregation side storage unit 12B, an aggregation side update unit 14B, and an aggregation side extraction unit 16B in place of, respectively, the aggregation side storage unit 12A, the aggregation side update unit 14, and the aggregation side extraction unit 16 in Embodiment 2 described above. The data aggregation device 10B in Embodiment 3 further includes a notification unit 19.

The collection side storage unit 4B stores a definition type 9 in addition to the collection side definition information 7 described above. Although not illustrated in FIG. 8, the collection side storage unit 4B may store device ID 8, for example, to identify a destination or source of data in communication between the data collection device 1B and the data aggregation device 10B. The definition type 9 represents the type of the collection side definition information 7. When two pieces of collection side definition information 7 are equal to each other, the definition types 9 of these respective pieces of collection side definition information 7 are equal to each other. For this reason, two pieces of collection side definition information 7 equal in definition type 9 are equal in data ID 7a, header value 7b, storage location 7c, data length 7d, and apparatus data. On the other hand, when two pieces of collection side definition information 7 are different from each other, the definition types 9 of these respective pieces of collection side definition information 7 are different from each other.

The extraction unit 5B extracts apparatus data from a packet and transmits, to the data aggregation device 10B via the second communication unit 3, data including the apparatus data, the data ID 7a of this apparatus data, and the definition type 9 stored in the collection side storage unit 4B.

When the predetermined condition is satisfied as in Embodiment 2 described above, the collection side update unit 6B transmits a request to the data aggregation device 10B via the second communication unit 3 to update the collection side definition information 7. At this time, the collection side update unit 6 causes this request to include the definition type 9.

The aggregation side storage unit 12B stores aggregation side definition information 15B in place of the aggregation side definition information 15A described above. The aggregation side definition information 15B includes pieces of sub-aggregation side definition information 18 associated with respective definition types 9 of a plurality of pieces of collection side definition information 7 in a plurality of data collection devices 1B. The pieces of sub-aggregation side definition information 18 correspond to the pieces of collection side definition information 7 of the respective definition types 9.

The aggregation side update unit 14B determines whether or not a definition type 9 received from a data collection device 1B via the processing communication unit 11 is included in the aggregation side definition information 15B. When this definition type 9 is not included in the aggregation side definition information 15B, the aggregation side update unit 14B acquires sub-aggregation side definition information 18 associated with this definition type 9, for example, from the cloud via the processing communication unit 11 and the wide area network 40, However, the aggregation side update unit 14B may acquire aggregation side definition information 15B including this sub-aggregation side definition information 18, The aggregation side update unit 14B adds the sub-aggregation side definition information 18 acquired via the wide area network 40 to the aggregation side definition information 15B stored in the aggregation side storage unit 12B to thereby update this aggregation side definition information 153. Alternatively, the aggregation side update unit 14B may update, by using the aggregation side definition information 15B including this sub-aggregation side definition information 18 acquired from the wide area network 40, the aggregation side definition information 15B stored in the aggregation side storage unit 12B. Hereinafter, this sub-aggregation side definition information 18 or aggregation side definition information 15B including this sub-aggregation side definition information 18 is referred to as information for updating the aggregation side definition information 15B.

When the processing communication unit 11 receives a request for information for updating from the data collection device 1B, the aggregation side extraction unit 16B searches in the aggregation side definition information 15B for a definition type 9 included in this request and sub-aggregation side definition information 18 including this definition type 9. Then, the aggregation side extraction unit 16B determines whether or not this definition type 9 and the sub-aggregation side definition information 18 including this definition type 9 are included in the aggregation side definition information 15B. When there is the sub-aggregation side definition information 18 including this definition type 9, the aggregation side extraction unit 16B extracts apparatus data from a packet included in this request by using this sub-aggregation side definition information 18. Such an extraction method is similar to that in Embodiment 1 or Embodiment 2 described above, and thus a description thereof is omitted.

When the aggregation side update unit 14B is not able to acquire information for updating the aggregation side definition information 15B via the wide area network 40, the notification unit 19 notifies the operator that the information for updating the aggregation side definition information 15B has not been able to be acquired. Incidentally, the notification unit 19 can be formed, for example, by a display device including, for example, a liquid crystal display, an Electroluminescence (EL) display, or a Cathode Ray Tube (CRT), or by an audio output device including, for example, a speaker.

Figure 9:
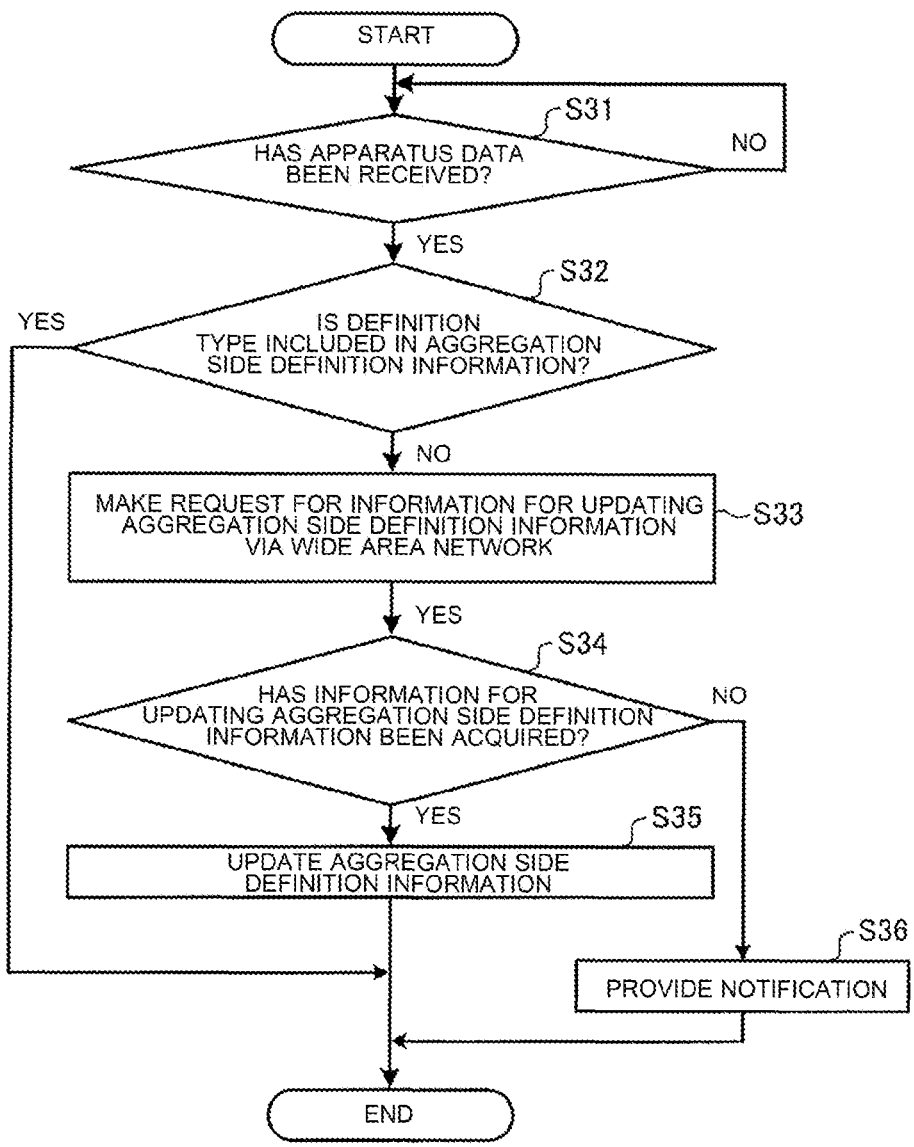
FIG. 9 illustrates an update process of updating aggregation side definition information performed by a data aggregation device in Embodiment 3.

FIG. 9 illustrates an update process of updating the aggregation side definition information performed by the data aggregation device in Embodiment 3. In step S31, the processing communication unit 11 of the data aggregation device 10B waits until the processing communication unit 11 receives apparatus data from the data collection device 1B (step S31: NO). Before the receipt of apparatus data, the data aggregation device 10B may perform another process. In step S31, when the processing communication unit 11 receives apparatus data from the data collection device 1B (step S31: YES), the aggregation side update unit 14B determines in step S32 whether or not a definition type 9 received together with this apparatus data is included in the aggregation side definition information 15B.

When this definition type is included in the aggregation side definition information 15B (step S32: YES), the aggregation side update unit 14B ends the process. When this definition type is not included in the aggregation side definition information 15B (step S32: NO), the aggregation side update unit 14B makes a request for information for updating the aggregation side definition information 15B, for example, to the cloud via the processing communication unit 11 and the wide area network 40 in step S33.

In step S34, when the processing communication unit 11 acquires the information for updating the aggregation side definition information 15B via the wide area network 40 (step S34: YES), the aggregation side update unit 14B updates the aggregation side definition information 15B by using this information for updating the aggregation side definition information 15B in step S35, When the processing communication unit 11 is not able to acquire the information for updating the aggregation side definition information 15B via the wide area network 40 (step S34: NO), the notification unit 19 provides, in step S36, by a display on a screen or voice, a notification that the information for updating the aggregation side definition information 15B has not been able to be acquired. After step S35 or step S36, the data aggregation device 10B ends the process.

Figure 10:
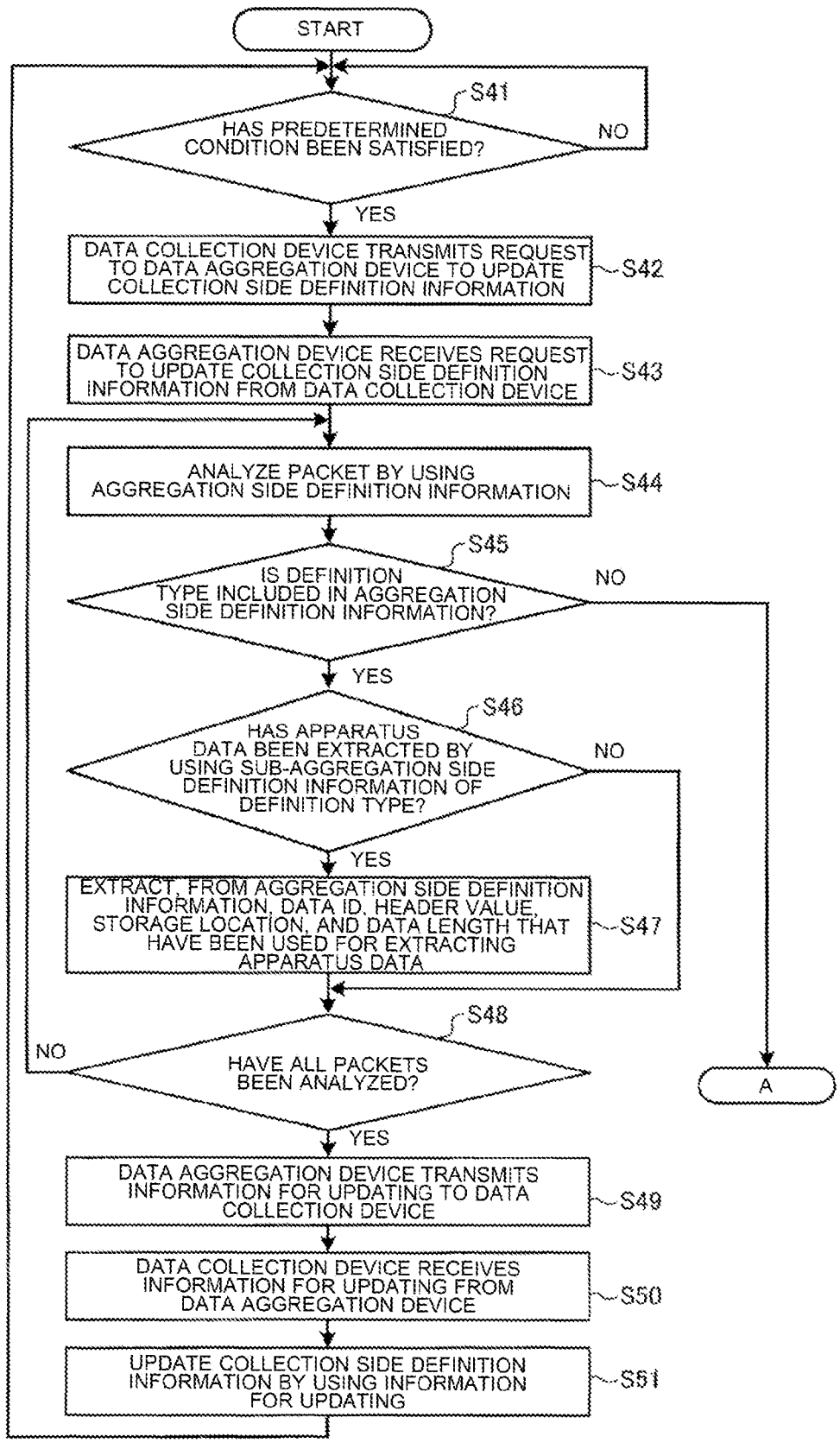
FIG. 10 illustrates an update process of updating collection side definition information performed by the remote monitoring system in Embodiment 3.

FIG. 10 illustrates an update process of updating collection side definition information performed by the remote monitoring system in Embodiment 3. Incidentally, in the remote monitoring system 100E according to Embodiment 3 as well, the preceding process illustrated in FIG. 3 is performed before the process presented in FIG. 10. This preceding process corresponds to the preceding process in which the collection side storage unit 4 and the extraction unit 5 described above with reference to FIG. 3 are respectively read as the collection side storage unit 4B and the extraction unit 5B. Furthermore, in Embodiment 3, the extraction unit 5 controls the second communication unit 3 in step S4 to cause the second communication unit 3 to transmit definition type 9 together with the apparatus data and the data ID 7a to the data aggregation device 10B.

In step S41, the collection side update unit 6B of the data collection device 1B determines whether or not a predetermined condition has been satisfied. This condition is similar to that in Embodiment 1 described above. When this condition has not been satisfied (step S41: NO), the process performed by the data collection device 1B stays at step S41. When this condition has been satisfied (step S41: YES), the collection side update unit 6B transmits, via the second communication unit 3, a request to update the collection side definition information 7 in step S42. In this request, a definition type 9, and packets stored in the collection side storage unit 4B by the extraction unit 5B in step S5 illustrated in FIG. 3 are included. In step S43, the processing communication unit 11 of the data aggregation device 10B receives the request to update the collection side definition information 7 from the data collection device 1B.

In step S44, the aggregation side extraction unit 16B of the data aggregation device 10B analyzes a packet included in the request received in step S43 by using the aggregation side definition information 15B, In such an analysis, the aggregation side extraction unit 16B searches in the aggregation side definition information 15B for the definition type 9 received by the processing communication unit 11 in step S43 and sub-aggregation side definition information 18 of this definition type 9.

In step S45, the aggregation side extraction unit 16B determines whether or not this definition type 9 and the sub-aggregation side definition information 18 of this definition type 9 are included in the aggregation side definition information 15B. When this definition type 9 and the sub-aggregation side definition information 18 of this definition type 9 are not included in the aggregation side definition information 15B (step S45: NO), the data aggregation device 10B performs a process of step S61 (FIG. 11) to be described. When this definition type 9 and the sub-aggregation side definition information 18 of this definition type 9 are included in the aggregation side definition information 15B (step S45: YES), the aggregation side extraction unit 16B performs, in step S46, an extraction process of extracting apparatus data from the packet by using a combination of data ID 15a, a header value 15b, a storage location 15c, and a data length 15d in the sub-aggregation side definition information 18 of this definition type 9.

In step S46, when the aggregation side extraction unit 16B is not able to extract apparatus data (step S46: NO), the data aggregation device 10B causes the process to proceed to step S48.

In step S46, when the aggregation side extraction unit 16B extracts apparatus data (step S46: YES), the aggregation side extraction unit 16B extracts, in step S47, from the aggregation side definition information 15B, the data ID 15a, the header value 15b, the storage location 15c, and the data length 15d that have been used for extracting this apparatus data.

In step S48, the aggregation side extraction unit 16B determines whether or not the aggregation side extraction unit 16B has analyzed all packets received in step S43. When such an analysis process has not been performed on all the packets by the aggregation side extraction unit 16B (step S48: NO), the aggregation side extraction unit 16B performs the process of step S44 and subsequent processes described above on packets that have not been analyzed.

When the analysis process has been performed on all the packets by the aggregation side extraction unit 163 (step S48: YES), the processing communication unit 11 transmits, in step S49, to the data collection device 1A, information for updating including the data ID 15a, the header value 15b, the storage location 15c, and the data length 15d that have been extracted by the aggregation side extraction unit 16B in step S47. This information for updating is, for example, the sub-aggregation side definition information 18 including this data ID 15a, this header value 15b, this storage location 15c, and this data length 15d. In step S50, the second communication unit 3 of the data collection device 1B receives the data transmitted by the data aggregation device 10B in step S49.

In step S51, the collection side update unit 6B updates the collection side definition information 7 by using the information for updating received in step S50.

Figure 11:
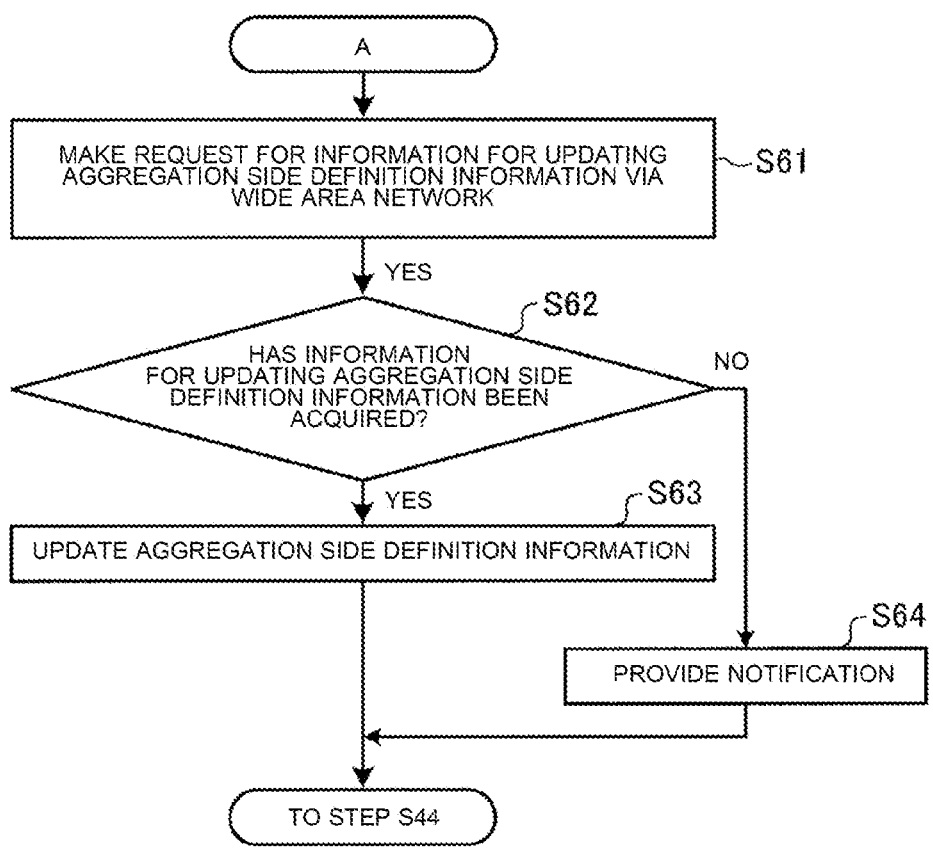
FIG. 11 illustrates an update process of updating the aggregation side definition information performed by the data aggregation device in Embodiment 3.

FIG. 11 illustrates an update process of updating the aggregation side definition information performed by the data aggregation device in Embodiment 3. In step S61, the aggregation side update unit 14B makes a request for information for updating the aggregation side definition information 15B, for example, to the cloud via the processing communication unit 11 and the wide area network 40.

In step S62, when the processing communication unit 11 acquires the information for updating the aggregation side definition information 15B via the wide area network 40 (step S62: YES), the aggregation side update unit 14B updates the aggregation side definition information 15B by using this information for updating the aggregation side definition information 15B in step S63. When the processing communication unit 11 is not able to acquire the information for updating the aggregation side definition information 15B via the wide area network 40 (step S63: NO), the notification unit 19 provides, in step 364, by a display on the screen or voice, a notification that this aggregation side definition information 15B is not able to be updated. After step S63 or step S64, the data aggregation device 10B causes the process to proceed to step S44.

Although, in Embodiment 3 described above, the case is described where the data aggregation device 10B extracts apparatus data from a packet, the data aggregation device 10B may transmit information for updating, such as sub-aggregation side definition information 18 of a definition type 9, to a data collection device 1B, and the extraction unit 5B of the data collection device 1B may extract apparatus data.

In the remote monitoring system 100E according to Embodiment 3, the types of pieces of collection side definition information 7 of a respective plurality of data collection devices 1B are classified according to definition type 9. The aggregation side storage unit 12B of the data aggregation device 10B stores aggregation side definition information 15B including sub-aggregation side definition information 18 corresponding to collection side definition information 7 of each definition type 9. The extraction unit 5B of each data collection device 1B transmits data including apparatus data and a definition type 9 to the data aggregation device 10B via the second communication unit 3. The collection side update unit 6B of the data collection device 1B transmits a request for information for updating to the data aggregation device 10B via the second communication unit 3, and the request includes a definition type 9. When the definition type 9 received from the data collection device 1B is not included in the aggregation side definition information 15B, the aggregation side update unit 14B of the data aggregation device 10B makes a request for information for updating the aggregation side definition information 15B, for example, to the cloud via the processing communication unit 11 and the wide area network 40.

Thus, when, for example, a model change is made on a data collection device 1B or a setting change is made in a data collection device 1B, even if the data aggregation device 10B does not have sub-aggregation side definition information 18 based on such a change, the data aggregation device 10B can transmit appropriate information for updating to this data collection device 1B. Furthermore, a data collection device 1B or the data aggregation device 10B can extract apparatus data from a packet acquired by this data collection device 1B from an installed apparatus 30. As a result, regardless of a change made on the data collection device 1B side, the data aggregation device 10B can continue monitoring the installed apparatus 30. Furthermore, even if a data collection device 1B having new device ID 8 is added, the aggregation side update unit 14B of the data aggregation device 10B updates the aggregation side definition information 15B not by using the device ID 8 of this data collection device 1B but by using a definition type 9 of the collection side definition information 7 of this data collection device 1B, and thus, when this definition type 9 has already been included in the aggregation side definition information 15B, unnecessary update processing can be omitted.

In the remote monitoring system 100B according to Embodiment 3, when the aggregation side update unit 14B of the data aggregation device 10B is not able to receive information for updating the aggregation side definition information 15B via the wide area network 40, the notification unit 19 provides a notification that information for updating the aggregation side definition information 15B has not been able to be received, and thus the operator can perform necessary processing, such as inputting sub-aggregation side definition information 18, to continue monitoring an installed apparatus 30.

REFERENCE SIGNS LIST 1, 1A, 1a data collection device, 2: first communication unit, 3: second communication unit, 4, 4A, 4B: collection side storage unit, 5, 5B: extraction unit, 6, 6A, 63: collection side update unit, 7: collection side definition information, 7a: data ID, 7b: header value, 7c: storage location, 7d: data length, 8: device ID, 9: definition type, 10, 10A, 10B: data aggregation device, 11: processing communication unit, 12, 12A, 12B: aggregation side storage unit, 13: input unit, 14, 143: aggregation side update unit, 15, 15A, 15B: aggregation side definition information, 15a: data ID, 15b: header value, 15c: storage location, 15d: data length, 15e: device ID rule, 16, 163: aggregation side extraction unit, 18: sub-aggregation side definition information, 19: notification unit, 20: transmission line, 30: installed apparatus, 40: wide area network, 100, 100A, 100B: remote monitoring system

The invention claimed is:

1. A remote monitoring system comprising: a plurality of data collection adaptors each configured to collect apparatus data including information representing at least either an operational situation or operational detail of one or more installed apparatuses from the one or more installed apparatuses being air conditioning apparatuses operated to condition air; and a data aggregation server configured to communicate with the plurality of data collection adaptors and configured to receive and aggregate the apparatus data that the plurality of data collection adaptors have each collected, wherein each data collection adaptor includes
a collection side storage configured to store collection side definition information defining one or more items for extracting the apparatus data from a set of data, and
at least one of a circuitry and processor with memory, configured to
acquire the set of data including the apparatus data from the one or more installed apparatuses,
extract the apparatus data from the set of data by using the collection side definition information, and
when a predetermined condition is satisfied, make a request to the data aggregation server to update the collection side definition information, wherein the data aggregation server includes
an aggregation side storage configured to store aggregation side definition information defining the one or more items each of the plurality of data collection adaptors uses for extracting the apparatus data from the set of data acquired by the data collection adaptor, and
at least one of a circuitry and processor with memory, configured to
when the request is received from one or more of the data collection adaptors, transmit information for updating based on the aggregation side definition information to the one or more of the data collection adaptors, and wherein each of the one or more of the data collection adaptors is further configured to
update the collection side definition information by using the information for updating received from the data aggregation server, wherein the plurality of data collection adaptors have unique second identifiers for identifying the respective plurality of data collection adaptors, wherein the aggregation side definition information defines
the one or more items associated with one or more of the second identifiers, wherein the request from the data collection adaptor includes
the set of data from which the data collection adaptor has not been able to extract the apparatus data based on the collection side definition information, and the second identifier identifying the data collection adaptor, wherein the data aggregation server is further configured to
when the request is received, search in the aggregation side definition information for the one or more of the second identifiers including the second identifier included in the request; when the one or more of the second identifiers are included in the aggregation side definition information, perform an extraction process of extracting, from the aggregation side definition information, the apparatus data indicated in the set of data included in the request by using the one or more items associated with the one or more of the second identifiers; and when the apparatus data is extracted by the extraction process, extract, from the aggregation side definition information, the one or more items associated with the one or more of the second identifiers, wherein the data aggregation server is configured to transmit the information for updating including the one or more items extracted by the data aggregation server to the data collection adaptor, which is a source of the request, and wherein each of the data collection adaptors is configured to update the collection side definition information using the information for updating from the data aggregation server and use the updated collection side definition information to extract the apparatus data.

2. The remote monitoring system of claim 1, wherein, when the data collection adaptor is not able to extract the apparatus data from the set of data, the data collection adaptor stores the set of data in the collection side storage, and wherein the predetermined condition is that a number of the sets of data stored in the collection side storage reaches a predetermined number, or that a number of the sets of data stored in the collection side storage reaches a predetermined number and a predetermined first time period elapses since updating of the collection side definition information.

3. The remote monitoring system of claim 1, wherein the data collection adaptor is further configured to transmit the apparatus data extracted by the data collection adaptor to the data aggregation server, and make the request to the data aggregation server.

4. The remote monitoring system of claim 1, wherein the data aggregation server further includes an input device configured to accept an input from an operator, and is further configured to update the aggregation side definition information to latest aggregation side definition information input to the input device.

5. The remote monitoring system of claim 1, wherein the data aggregation server is further configured to update the aggregation side definition information to latest aggregation side definition information which is received.

6. The remote monitoring system of claim 1, wherein the set of data is a packet, and wherein the one or more items include a first identifier identifying a type of the apparatus data, a header value of the packet including the apparatus data, a storage location of the apparatus data in the packet, and a data length of the apparatus data.

7. The remote monitoring system of claim 1, wherein, when the data collection adaptor receives the information for updating from the data aggregation server, the data collection adaptor updates the collection side definition information immediately after receipt of the information for updating or after a predetermined second time period has elapsed since receipt of the information for updating.

8. The remote monitoring system of claim 1, wherein the information for updating is the aggregation side definition information.

9. The remote monitoring system of claim 8, wherein the data collection adaptor is further configured to replace the collection side definition information stored in the collection side storage with the aggregation side definition information received from the data aggregation server.

10. A remote monitoring method implemented by a remote monitoring system including a plurality of data collection adaptors each configured to collect apparatus data including information representing at least either an operational situation or operational detail of one or more installed apparatuses from the one or more installed apparatuses being air conditioning apparatuses operated to condition air, and a data aggregation server configured to communicate with the plurality of data collection adaptors and configured to receive and aggregate the apparatus data that the plurality of data collection adaptors have each collected, the remote monitoring method comprising:

with each data collection adaptor including a collection side storage configured to store collection side definition information defining one or more items for extracting the apparatus data from a set of data including the apparatus data acquired from the one or more installed apparatuses, acquiring the set of data from the one or more installed apparatuses;

extracting the apparatus data from the set of data by using the collection side definition information;

when a predetermined condition is satisfied, making a request to the data aggregation server to update the collection side definition information; and with the data aggregation server including an aggregation side storage configured to store aggregation side definition information defining the one or more items each of the plurality of data collection adaptors uses for extracting the apparatus data from the set of data acquired by the data collection adaptor, when the request is received from one or more of the data collection adaptors, transmitting information for updating based on the aggregation side definition information to the one or more of the data collection adaptors, further comprising, by each of the one or more of the data collection adaptors, updating the collection side definition information by using the information for updating received from the data aggregation server, wherein the plurality of data collection adaptors have unique second identifiers for identifying the respective plurality of data collection adaptors, wherein the aggregation side definition information defines the one or more items associated with one or more of the second identifiers, wherein the request from the data collection adaptor includes the set of data from which the data collection adaptor has not been able to extract the apparatus data in the extraction step, and the second identifier identifying the data collection adaptor, further comprising, by the data aggregation server, when the request is received, searching in the aggregation side definition information for the one or more of the second identifiers including the second identifier included in the request; when the one or more of the second identifiers are included in the aggregation side definition information, performing an extraction process of extracting, from the aggregation side definition information, the apparatus data indicated in the set of data included in the request by using the one or more items associated with the one or more of the second identifiers; and when the apparatus data is extracted by the extraction process, extracting, from the aggregation side definition information, the one or more items associated with the one or more of the second identifiers, and transmitting the information for updating including the one or more items extracted by the data aggravation server to the data collection adaptor, which is a source of the request, and by each of the data collection adaptors, updating the collection side definition information using the information for updating from the data aggregation server and using the updated collection side definition information to extract the apparatus data.

11. The remote monitoring method of claim 10, further comprising, by the data collection adaptor, when the data collection adaptor is not able to extract the apparatus data from the set of data, storing the set of data in the collection side storage, and wherein the predetermined condition is that a number of the sets of data stored in the collection side storage reaches a predetermined number, or that a number of the sets of data stored in the collection side storage reaches a predetermined number and a predetermined first time period elapses since updating of the collection side definition information.

12. The remote monitoring method of claim 10, wherein the data aggregation server further includes an input device configured to accept an input from an operator, and further comprising, by the data aggregation server, updating the aggregation side definition information to latest aggregation side definition information input to the input device.

13. The remote monitoring method of claim 10, wherein the set of data is a packet, and wherein the one or more items include a first identifier identifying a type of the apparatus data, a header value of the packet including the apparatus data, a storage location of the apparatus data in the packet, and a data length of the apparatus data.

14. A remote monitoring system comprising: a plurality of data collection adaptors each configured to collect apparatus data including information representing at least either an operational situation or operational detail of one or more installed apparatuses from the one or more installed apparatuses being air conditioning apparatuses operated to condition air, and a data aggregation server configured to communicate with the plurality of data collection adaptors and configured to receive and aggregate the apparatus data that the plurality of data collection adaptors have each collected, wherein each data collection adaptor includes a collection side storage configured to store collection side definition information defining one or more items for extracting the apparatus data from a set of data and a third identifier showing a type of the collection side definition information, and at least one of a circuitry and processor with memory, configured to acquire the set of data including the apparatus data from the one or more installed apparatuses, extract the apparatus data from the set of data by using the collection side definition information, and when a predetermined condition is satisfied, make a request to the data aggregation server to update the collection side definition information, wherein the data aggregation server includes an aggregation side storage configured to store sub-aggregation side definition information in association with the third identifier showing a type of the sub-aggregation side definition information which defining the one or more items each of the plurality of data collection adaptors uses for extracting the apparatus data from the set of data acquired by the data collection adaptor, and at least one of a circuitry and processor with memory, configured to when the request is received from one or more of the data collection adaptors, transmit information for updating based on the sub-aggregation side definition information associated with the third identifier that is stored in one or more of the data collection adaptors to the one or more of the data collection adaptors, and wherein each of the one or more of the data collection adaptors is further configured to update the collection side definition information by using the information for updating received from the data aggregation server, wherein the request from the data collection adaptor includes the set of data from which the apparatus data has not been able to be extracted by the data collection adaptor, and the third identifier stored in the data collection adaptor, wherein the data aggregation server is further configured to when the request is received, perform an extraction process of extracting, from the aggregation side definition information, the apparatus data indicated in the set of data included in the request by using the one or more items defined in the sub-aggregation side definition information associated with the third identifier included in the request; and, when the apparatus data is extracted by the extract, from the aggregation side definition information, the one or more items defined in the sub-aggregation side definition information associated with the third identifier, wherein the data aggregation server is configured to transmit the information for updating including the one or more items extracted by the data aggregation server to the data collection adaptor, which is a source of the request, and wherein each of the data collection adaptors is configured to update the collection side definition information using the information for updating from the data aggregation server and use the updated collection side definition information to extract the apparatus data.

15. The remote monitoring system of claim 14, wherein the aggregation side storage is configured to store aggregation side definition information including a plurality of the sub-aggregation definition information that causes a plurality of the data collection adaptors to extract the apparatus data, and the unique third identifiers each showing each type of the sub-aggregation side definition information, the data aggregation server is configured to, when the third identifier included in the received request is not included the aggregation side definition information, receive the sub-aggregation side definition information associated with the third identifier from the outside, and the data aggregation server is further configured to update the aggregation side definition information by using the sub-aggregation side definition information received by the data aggregation server.

16. The remote monitoring system of claim 15, wherein the data aggregation server is further configured to notify, when the data aggregation server has not been able to receive the sub-aggregation definition information associated with the third identifier included in the request, that the sub-aggregation definition information associated with the third identifier included in the request has not been able to be received.

17. The remote monitoring system of claim 14, wherein, when the data collection adaptor is not able to extract the apparatus data from the set of data, the data collection adaptor stores the set of data in the collection side storage, and wherein the predetermined condition is that a number of the sets of data stored in the collection side storage reaches a predetermined number, or that a number of the sets of data stored in the collection side storage reaches a predetermined number and a predetermined first time period elapses since updating of the collection side definition information.

18. The remote monitoring system of claim 14, wherein the data aggregation server further includes an input device configured to accept an input from an operator, and is further configured to update the aggregation side definition information to latest aggregation side definition information input to the input device.

19. The remote monitoring system of claim 14, wherein the set of data is a packet, and wherein the one or more items include a first identifier identifying a type of the apparatus data, a header value of the packet including the apparatus data, a storage location of the apparatus data in the packet, and a data length of the apparatus data.

\* \* \* \* \*